United States Patent
Bernays et al.

(10) Patent No.: US 11,250,375 B2
(45) Date of Patent: Feb. 15, 2022

(54) SYSTEMS AND METHODS FOR INTELLIGENT INVENTORY MANAGEMENT ACROSS NETWORK OF VENDING MACHINES

(71) Applicant: ROMAINE EMPIRE, INC., Chicago, IL (US)

(72) Inventors: Benjamin Ephraim Bernays, Evanston, IL (US); Taylor Miller Marx, Chicago, IL (US)

(73) Assignee: ROMAINE EMPIRE, INC., Chicago, IL (US)

( * ) Notice: Subject to any disclaimer, the term of this patent is extended or adjusted under 35 U.S.C. 154(b) by 149 days.

(21) Appl. No.: 16/428,438

(22) Filed: May 31, 2019

(65) Prior Publication Data

US 2020/0380453 A1   Dec. 3, 2020

(51) Int. Cl.
*G06Q 10/08*   (2012.01)
*G07F 9/02*   (2006.01)
*G06Q 30/02*   (2012.01)
*G07F 9/00*   (2006.01)

(52) U.S. Cl.
CPC ....... *G06Q 10/087* (2013.01); *G06Q 30/0202* (2013.01); *G07F 9/006* (2013.01); *G07F 9/026* (2013.01)

(58) Field of Classification Search
CPC ............. G06Q 10/087; G06Q 30/0202; G06Q 30/0605; G07F 9/006
USPC ......................................................... 705/28
See application file for complete search history.

(56) References Cited

U.S. PATENT DOCUMENTS

| | | | | |
|---|---|---|---|---|
| 10,373,117 | B1* | 8/2019 | Sadighian | G06Q 10/0875 |
| 2007/0239519 | A1* | 10/2007 | Walker | G06Q 30/02 |
| | | | | 705/7.29 |
| 2014/0257928 | A1* | 9/2014 | Chen | G06Q 30/0202 |
| | | | | 705/7.31 |
| 2016/0247127 | A1* | 8/2016 | Arora | G06Q 10/087 |

FOREIGN PATENT DOCUMENTS

| | | | | |
|---|---|---|---|---|
| JP | 09245234 | A | * | 9/1997 |
| JP | 2003036464 | A | * | 2/2003 |

* cited by examiner

*Primary Examiner* — Luna Champagne
(74) *Attorney, Agent, or Firm* — Marshall, Gerstein & Borun LLP

(57) ABSTRACT

Systems and methods for intelligently allocating inventory across a network of vending machines. The systems and methods include associating vending machines with an inventory target for a product and predicting a production requirement of the product based upon the respective inventory targets. After production occurs, the systems and methods include determining a difference between an amount of the product produced by the production facility based upon the predicted production requirement. To intelligently allocate the difference, the systems and methods include calculating a percentage by which the respective inventory target of vending machines changes if the modified and modifying the inventory target for vending machines in a manner that minimizes a sum of the percentages by which the respective inventory targets changes.

18 Claims, 7 Drawing Sheets

400

| Item | Location | Monday | | Tuesday | |
|---|---|---|---|---|---|
| | | Pars | Replenishment | Pars | Replenishment |
| North Napa Salad | Location 1 | 4 | 100% | 4 | 60% |
| | Location 2 | 10 | 100% | 10 | 70% |
| | Location 3 | 2 | 100% | 2 | 50% |
| | Location ... | ... | | ... | |
| | Total | 200 | 100% | 205 | 56% |

| Forecast | Monday | Tuesday |
|---|---|---|
| | 200 * 100% | 205 * 56% |
| | 200 | 115 |

| Production | Monday | Tuesday |
|---|---|---|
| North Napa Salad | 200 | 115 |
| Southwest Salad | 185 | 105 |
| Pesto Pasta Bowl | 165 | 85 |

*FIG. 4*

SYSTEMS AND METHODS FOR INTELLIGENT INVENTORY MANAGEMENT ACROSS NETWORK OF VENDING MACHINES

BACKGROUND

The present disclosure generally relates to an intelligent inventory management system configured to allocate inventory across a network of vending machines and/or point of sale locations.

Conventionally, inventory management for vending machines or other point of sale locations is a non-agile process. To this end, conventional vending machines generally are configured to dispense non-perishable products (or products that have a shelf life over a month). Accordingly, there is little need to worry about overstocking a vending machine as products will generally be sold through before the product expires. However, when a vending machine is adapted to offer perishable or fresh food products (e.g., products with a shelf life under a week), these conventional approaches to vending machine inventory management cause significant waste or require a production facility to achieve a level of production quantity flexibility that is generally not practical. Accordingly, there is a need for an intelligent inventory management system that adaptively manages inventory across a network of vending machines and/or other point of sale locations.

SUMMARY

The present disclosure relates to an intelligent inventory management system for intelligently allocating products across a network of vending machines configured to offer perishable products for sale. Consequently, each vending machine is allocated the appropriate amount of each product, thereby reducing the overall amount of waste across the network of vending machines. It should be appreciated that the techniques described herein may be adapted for implementation at any point of sale location. For the sake of brevity and unless otherwise indicated, any reference to "vending machine" not in reference to the particular hardware features of a vending machine envisions performance at any point of sale location.

According to certain aspects, each vending machine within the network of vending machines is associated with an inventory target or "par" indicative of the amount of each product to stock in the vending machine such that the product will sell through its inventory without incurring lost sales due to the product being sold out. The par for a vending machine may be based upon metrics associated with the vending machine, such as a stockout rate (i.e., a rate at which the product sells through), a waste rate (i.e., a rate at which the product goes unsold), a stockout time (i.e., an amount of time at which there is no inventory of the product at the vending machine), a shelf life, an item type, and/or any combination thereof.

It should be appreciated that it is difficult for a vending machine operator to determine how many lost sales occurred due to stockouts. To this end, after a conventional vending machine is sold out of a product, the vending machine operator is unable to determine whether one sale was lost, two sales were lost, or even if no sales were lost. Accordingly, the conventional vending machine operator does not know the amount of inventory with which the vending machine should be restocked to avoid future lost sales due to stockouts. Techniques disclosed herein provide a mechanism by which lost sales can be more accurately determined. In some embodiments, the vending machine may provide an interface via which the user interacts to indicate that the user would have purchased a product that is generally offered for sale at the vending machine, but is currently stocked out. The indication may be a user interacting with a particular element to expressly indicate the desire to purchase a stocked out item or the indication may be a series of interactions indicative of a user being unable to purchase a particular product (e.g., the user viewed product details about multiple products without purchasing a product, the user attempted to select a software indication of the stocked out product, and so on). Accordingly, by determining an indication of the lost sales at a particular vending machine due to a stockout, the inventory management system is able to more accurately determine the par for a vending machine, thereby reducing the likelihood of future stockouts that lead to lost sales.

The inventory management system may include a production facility that produces the perishable or fresh food products that are offered for sale via the vending machines within the network of vending machines. In order to forecast how much of a product should be produced to maintain the pars at each of the vending machines, the inventory management system may be configured to analyze aggregate the metrics associated with the vending machines within the network of vending machines. For example, the inventory management system may determine an amount of product to produce such that each vending machine within the network of vending machines is able to maintain their par.

It should be appreciated that a delay occurs between forecasting an amount of a product to produce and when the production is complete. For example, in addition to the time required to produce the product, the production facility needs to have a lead time to source the ingredients the comprise the products. Accordingly, there is a tension between providing sufficient lead time for sourcing and permitting more sales at the vending machines to occur in order to obtain more accurate metrics associated with the vending machines. Techniques described herein enable the production facility to access the dynamic vending machine metrics to be able to more accurately predict sourcing requirements. Thus, the lead time required to produce product can be reduced, thereby enabling the collection of additional vending machine data before the start of production. Accordingly, the disclosed techniques improve accuracy of the par calculations.

Nonetheless, there is frequently still a difference between the amount of product required to maintain the pars at each vending machine and the amount of product produced. While the disclosed techniques reduce the difference between the forecasted amount of product and the actual amount of product needed to maintain the pars, in many scenarios, a difference still exists. Accordingly, this difference must be allocated across the network of vending machines.

The inventory management system may be configured to determine which vending machines are able to absorb the surplus (or deficit) of product while minimizing the likelihood of the product being wasted and/or losing sales due to a stockout. The inventory management system may be configured to calculate a percentage by which adding (or subtracting) a product to the inventory target modifies the inventory target. By selecting a combination of vending machines that minimizes the percentages of changes, the inventory management system efficiently distributes the surplus (or deficit) across the network of vending machines.

As a result, the difference between the forecasted production requirement and the actual product need after production is less likely to result in waste or lost sales.

Additional objects, advantages and improved features may become apparent to those skilled in the art upon examination of the following description and the accompanying drawings or may be learned by production or operation of the described examples.

BRIEF DESCRIPTION OF THE FIGURES

FIG. 4 is a flow diagram indicative of an intelligent inventory management process that may be implemented in the example management server of FIGS. 1 and 3;

DETAILED DESCRIPTION

Figure 1:
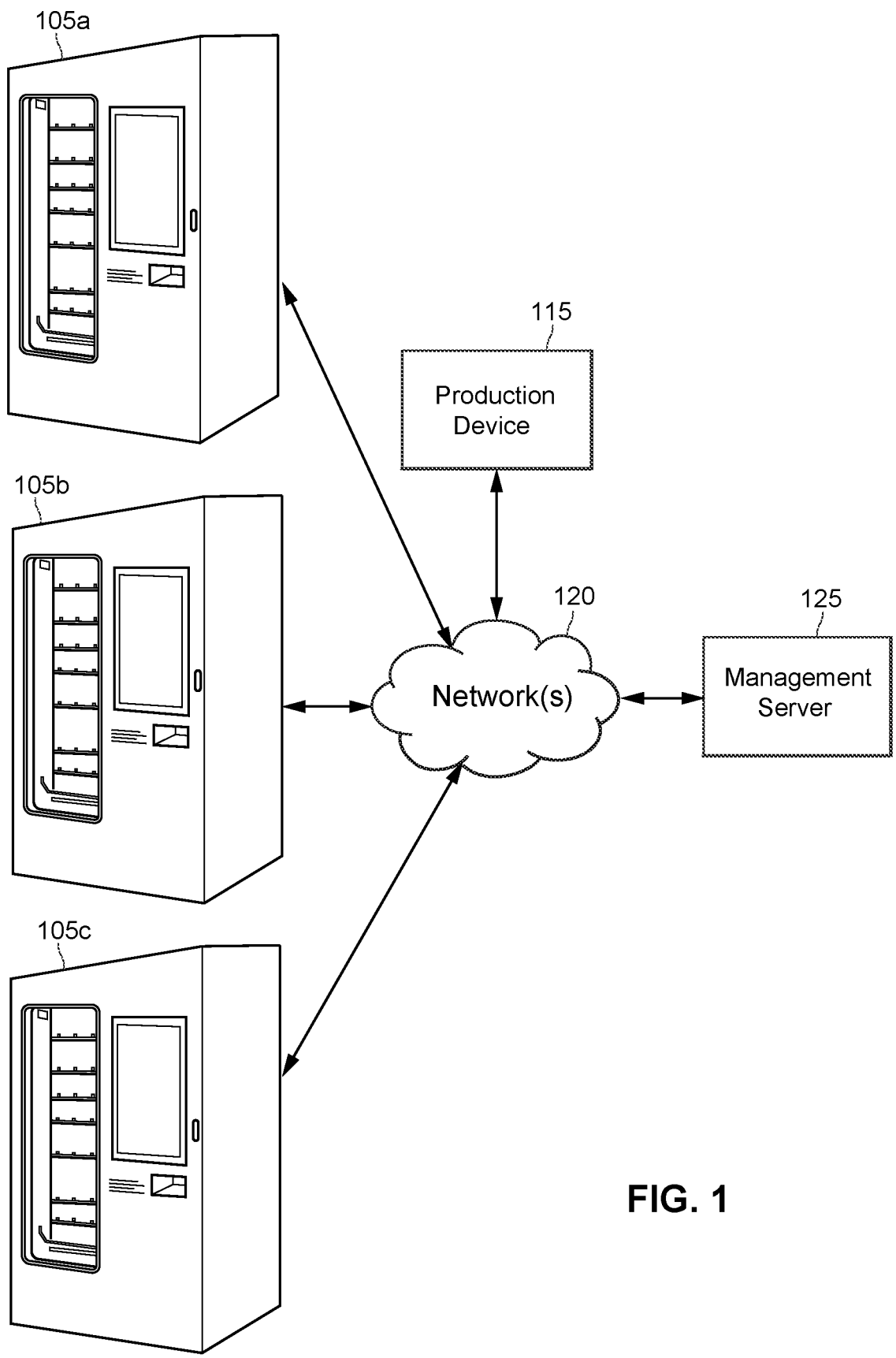
FIG. 1 illustrates an example intelligent inventory management system for a network of vending machines in which the present techniques are implemented.

Referring to the figures in detail, FIG. 1 illustrates an example intelligent inventory management system 100 for a network of vending machines 105 in which the present techniques are implemented. As illustrated, the network of vending machines 105 includes individual vending machines 105a, 105b, and 105c connected to a management server 125 via a network 120. Although, FIG. 1 illustrates only three vending machines within the network of vending machines 105, the intelligent inventory management system 100 may include any number of additional vending machines 105. Each vending machine 105 may be a self-service unit that combines electro-mechanical dispensing components, temperature control components, network connectivity, and a user interface for customer interaction.

The network of vending machines 105 may include any suitable vending machine. For example, the vending machines 105 may include a storage system for holding individual food products for purchase. The storage system may include a plurality of slots adapted to store a plurality of individually dispensable products loaded therein. The slots may be substantially horizontal, such as embodiments that include a conveyor belt, shelf, or coil, or substantially vertical. In an example, each individual storage unit of the slot is associated with a sensor and/or a slot location identifier.

The vending machines 105 may also include an atmospheric control system that includes a variety of sensors and controllers for temperature, air composition, and/or humidity control. The temperature control components may include a cooling or refrigerating apparatus, a heating or warming apparatus, and/or other temperature control apparatuses to maintain a desired temperature associated with the items stored therein. For example, some fresh foods are best stored between 35-40° F. (1.66-4.44° C.). In some embodiments, the vending machines 105 include different temperature control apparatus to regulate the temperature of different slots. A temperature control apparatus may include one or more sensors to provide feedback to a regulator of the temperature control apparatus.

The vending machines 105 may also include a point of sale system. In some embodiments, the point of sale system includes one or more mechanisms to receive a customer selection of a particular item. For example, the selection mechanisms may include one or more buttons and/or a touch screen display. Additionally, the point of sale system of the vending machine 105 may include a payment system adapted to receive and/or process cash, gift cards, promotions, customer account credits, and/or credit cards. The vending machines 105 may also include a merchandise selector including a user interface, key pad, and/or switches for customers to select the desired item for purchase. According to certain aspects, the inventory control system of the vending machine 105 implements monitors behavior of consumers to identify behaviors associated with a consumer being unable to purchase a desired product. In some embodiments, the user interface of the vending machines 105 associates a user-selectable graphical interface selection indicative of a consumer's dissatisfaction with the unavailability of a particular item, hereinafter referred to as a "bummer button", with unavailable products (e.g., the product is stocked out or the remaining products are reserved) to enable the consumer to expressly indicate that the consumer would have purchased the unavailable product.

As illustrated in FIG. 1, the vending machines 105 are in communication with the management server 125 via the network 120. The network 120 may facilitate any type of data communication via any current or future-developed standard or technology (e.g., GSM, CDMA, TDMA, WCDMA, NR, LTE, EDGE, OFDM, GPRS, EV-DO, UWB, IEEE 802 including Ethernet and Wi-Fi, WiMAX, Bluetooth, RS-232 serial communications, and others). In some embodiments, the network 120 utilizes two or more of the communication standards or technologies. For example, the vending machine 105a may communication with the management server 125 via a IEEE 802 connection and the vending machine 105b may communication with the management server 125 via a LTE connection. For example, the management server 125 may be adapted to receive reservation requests from client devices (e.g., mobile phones, computers, etc.) for products located at the vending machines 105. Accordingly, in response to receiving a reservation request for a product at a particular vending machine 105, the management server 125 may transmit a reservation request to the particular vending machine 105. An example implementation of the reservation process is described in U.S. patent application Ser. No. 16/267,039, the entire disclosure of which is hereby incorporated by reference.

In some embodiments, the inventory control system of a particular vending machine 105 is configured to dynamically monitor inventory within the particular vending machine 105. In one example, the inventory control system of the particular vending machine 105 communicates the current inventory to the management server 125 to maintain a central record of the inventory. In this example, the inventory update may include a sale record associated with the change in inventory. In some embodiments, the particular vending machine 105 monitors the inventory based on a sensor associated with the various item slots. When an item is purchased, the inventory control system detects corresponding sensor data that indicates that the item is no longer within the particular vending machine 105. In other embodiments, the inventory control system monitors transaction data from the point of sale system to update an inventory record accordingly. According to aspects, the transaction data may also include customer data such as demographic data, customer profile information, addressing information (including an identity and/or address of a customer electronic device), and so on.

According to aspects, the management server 125 monitors the inventory records associated with the vending machines 105 to generate metrics associated with each of the vending machines 105. For example, the management server 125 may be configured to detect when a particular product at the particular vending machine 105 becomes stocked out and calculate an amount of time the product is stocked out. Similarly, the management server 125 may monitor historical stockout data associated with the particular vending machine 105 to generate a rate at which the product becomes stocked out (e.g., the ratio between days per week the product become stocked out vs. days per week the product is available for sale at the particular vending machine 105). Additionally, the centralized inventory records for a particular product may include a shelf life and a stocking date. Accordingly, the management server 125 may be configured to detect how much of the product is wasted due to expiration and/or a rate at which the product is wasted (e.g., the ratio between days per week the product is wasted vs. days per week the product is available for sale at the particular vending machine 105).

As illustrated, the intelligent inventory management system 100 includes a production device 115 associated with a production facility that produces the product and/or fresh food for distribution via the network of vending machines 105. The production device 115 may be a computer or other electronic device located at the production facility configured to obtain production orders from the management server 125 via the network 120. The management server 125 may be configured to analyze the metrics associated with the network of vending machines 105 to forecast how much product should be produced by the production facility. For example, the management server 125 may be configured to forecast how much product should be produced such that each of the vending machines 105 can be stocked at their respective inventory target for the product. Accordingly, the management server 125 may be configured to analyze the metrics to ensure sufficient ingredients for production are sourced to ensure that the forecasted amount of product can be made. In some embodiments, the management server 125 performs an initial analysis of the vending machine metrics to determine a sourcing decision, and a subsequent analysis to determine how of the of the product to actually make. The management server 125 may be configured to push the production orders to the production device 115 to initiate the actual manual or automatic production of the products.

According to aspects, the allocation of products produced by the production facility across the vending machines 105 may be regulated by the management server 125. To this end, the production device 115 may be configured to transmit, via the network 120, an indication of an amount of product produced during a production run at the production facility. In some embodiments, the production device 115 is operatively connected to one or more devices that provide data indicative of an amount of each product actually produced by the production facility e.g., RFID readers, barcode scanners, devices that act upon the product as part of the production process, such as devices that stamp product packaging with an expiration date or other information about the product). Accordingly, in these embodiments, the production device 115 may automatically determine the amount of product produced during the production run based on the received indications. Additionally or alternatively, the production device 115 may include one or more user input devices for a user of the production device 115 to manually input the amount of product produced during the production run.

The management server 125 may modify inventory allocation to correct for a production surplus or deficit that occurs due to the forecasted production not being aligned with the restocking requirements needed to maintain the inventory target at each of the vending machines 105. More particularly, the management server 125 may be configured to distribute the surplus or deficit across the network of vending machines 105 to minimize the likelihood of waste or stockouts occurring. The management server 125 transmits an indication of the amount product allocated and/or re-allocated to the vending machines 105 to the production device 115 to cause the production device 115 to produce packing slips that indicate which of the vending machines 105 the particular products should be delivered. According to aspects, after the products have been restocked at the respective vending machines 105, the vending machines 105 may be configured to transmit an inventory update to the management server 125 that indicates the restocked inventory levels for the product at the vending machines 105.

Example Vending Machine

Figure 2:
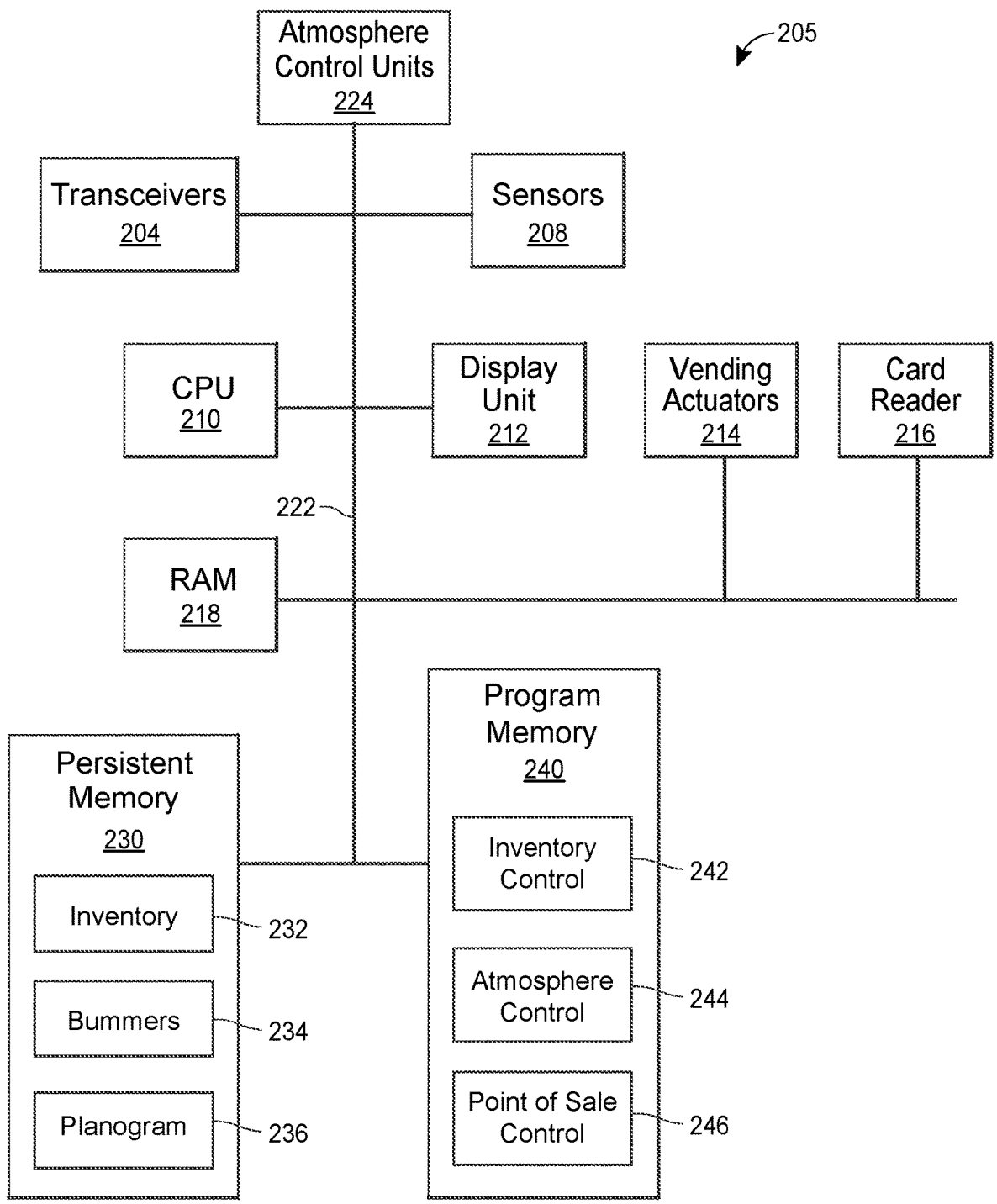
FIG. 2 is a block diagram of an example vending machine that may be used in the example system of FIG. 1.

Turning to FIG. 2, illustrated is an example vending machine 205, such as the vending machine 105a of FIG. 1, at which functionality described herein is implemented. The vending machine 205 includes one or more processors, such as the depicted central processing unit (CPU) 202. Although not depicted, the vending machine 205 may also include a graphics processing unit (GPU). During operation, the CPU 202 executes instructions stored in a program memory module 240 coupled to the CPU 202 via a system bus 222. In some implementations, the program memory module 240 is implemented in a random access memory (RAM) module 218, a persistent memory module 230, or both. The program memory module 240 may also store computer-readable instructions that regulate the operation of the vending machine 205. One set of instructions may be an inventory control application 242 that contains instructions to facilitate inventory control functionality. For example, the inventory control application 242 may maintain an accurate record of the various items stored at the vending machine 205. This record may be maintained at the inventory database 232 of the persistent memory 230. The records in the inventory database 232 may include indications of an item identifier, a stock keeping unit (SKU) identifier, a location (such as a slot identifier), expiration data, an item status (e.g., available, reserved, expired, locked, sold, etc.), and so on. In some embodiments, the inventory database 232 also includes SKU-based records that include indications of SKU quantity, a cost, SKU status (e.g., normal, recalled, promoted, stocked out, etc.). The SKU-based records may be automatically update in response to changes to item records. For example, when the inventory control application 242 updates an item record to indicate that a particular item has been sold, the SKU-record may automatically decrement a quantity parameter.

As another example, the slot identifier associated with the item or SKU records may be determined based upon a stored planogram 236. The planogram 236 is a "map" that associates the various slots of the vending machine 205 with particular items or SKUs. In some embodiments, updates to the planogram 236 are transmitted by a management server to the vending machine 205 for local storage. In these embodiments, the planogram 236 may also be transmitted to a service electronic device such that service personnel may maintain the vending machine inventory in accordance with the planogram 236. In other embodiments, each individual item is uniquely tagged (such as with an RFID tag or a QR or other barcode). In these embodiments, the sensors 208 detect the location of the various items to dynamically update the planogram 236. Additionally, the inventory control application 242 may transmit updates to the planogram 236 to the management server to synchronize back-end systems.

As illustrated in FIG. 2, the inventory control application 242 may also control vending actuators 214 to vend a particular item. It should be appreciated that in other embodiments, control of the vending actuators 214 is processed by a separate application. The vending actuators 214 may be any actuator that controls a vending mechanism (e.g., a coil, a conveyor belt, a motorized shelf, a grabbing arm, a suction unit, etc.). In some embodiments, the vending actuators 214 include a separate controller configured to interpret control signals generated by the inventory control application 242 and transmitted over the system bus 222. For example, in response to detecting a purchase event for a Napa salad, the inventory control application 242 may query the inventory database 232 to identify a slot that stores a Napa salad and generate a vending command that indicates the slot identifier. The controller of the vending actuators 214 may include a queue to process multiple vending commands associated with a multi-item order.

The program memory 240 may also include a set of instructions that comprises an atmosphere control application 244. The atmosphere control application 244 may control the operation of the atmosphere control units 224 via instructions transmitted over the system bus 222. The atmosphere control units may include refrigeration units, heating units, humidifiers, oxygenators, and/or any other mechanism that controls the atmospheric environment within the vending machine 205. In some embodiments, the atmosphere control application 244 divides the vending machine into different climate zones to maintain multiple atmospheric environments simultaneously. Accordingly, the atmosphere control application 244 may utilize the output of sensors 208 to generate appropriate control signals for the atmosphere control units 224.

The program memory 240 may also include a set of instructions that comprises a point of sale control application 246 configured to support the ordering of items and the processing of payments at the vending machine 215. The point of sale control application 246 may be configured to cause a display unit 212 to present one or more interfaces that guide a customer through the purchase process. The display unit 212 may include a touch-screen display for receiving user input. In some embodiments, the point of sale control application 246 may query the inventory database 236 to populate the interfaces with indications of the available inventory. As part of the payment process, the point of sale control application 246 monitors inputs at a card reader 216 to detect credit card information for completing the purchase.

Figure 6:
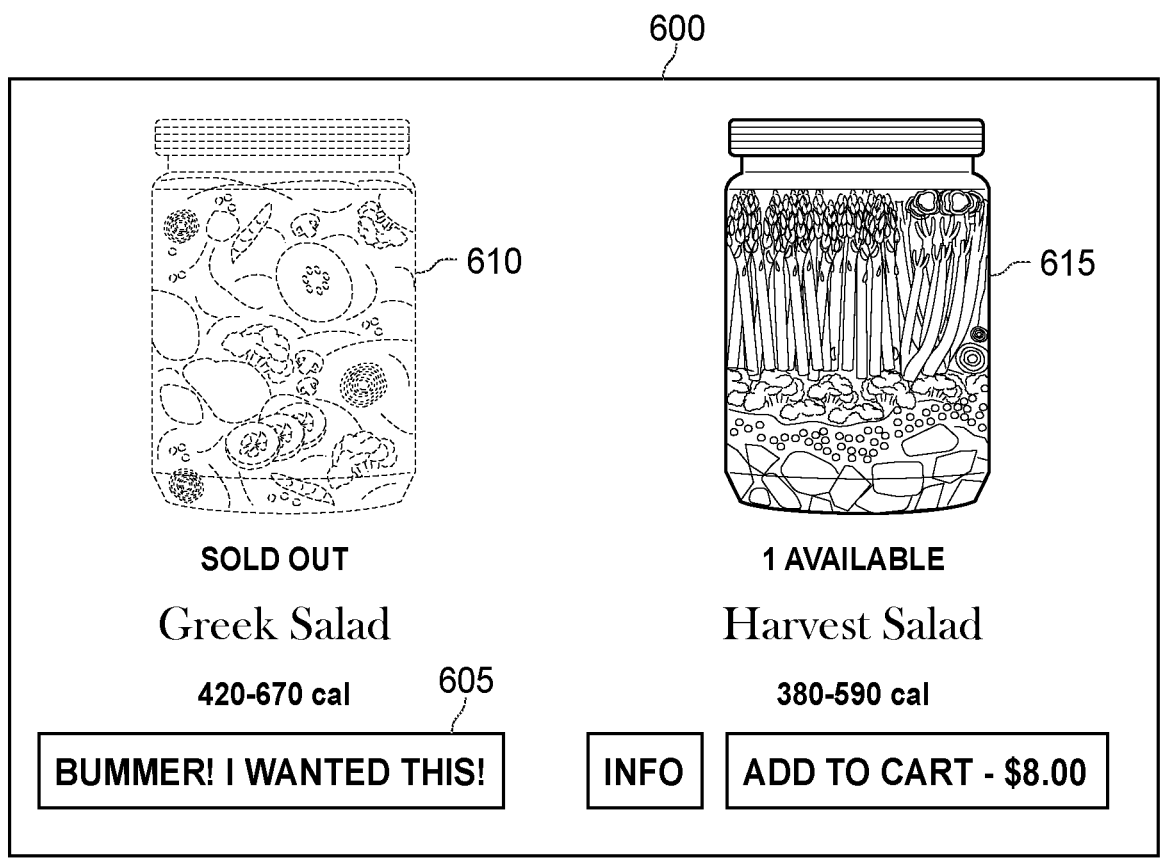
FIG. 6 illustrates an example interface by implemented at the vending machine of FIG. 1 or 2 to indicate an intention to purchase a product not available for purchase at the vending machine.

According to aspects, the point of sale control application 246 may be configured to monitor customer activity to detect that the customer was unable to purchase a desired product (a "bummer"). For example, when a product that is normally offered sale at the vending machine is unavailable (e.g., the inventory database 232 indicates that there is no available product), the point of sale control application may be configured to cause the display unit 216 to indicate that the product is unavailable. With simultaneous reference to FIG. 6, illustrated is an example interface 600 that indicates that a product is unavailable. In the scenario represented by the interface 600, the Greek salad is stocked out while the harvest salad is still available for purchase. Accordingly, an interface element 610 indicative of the Greek salad is greyed out, whereas an interface element 615 indicative of the harvest salad is displayed normally. Additionally, the interface 600 includes a selectable interface element 605 associated with the Greek salad that enables the customer to indicate that they would have purchased the Greek salad had the Greek salad not been stocked out. Upon detecting a customer interaction with the interface element 605, the point of sale control application 246 may record a bummer event at a bummer database 234. The record may include a SKU identifier, a customer identifier, a time of day, and/or other information associated with a state of the vending machine 205 when the customer interacted with the interface element 605. Additionally, the record may include indications of whether the customer completed a purchase for another product and/or did not complete any purchase (i.e., the customer left without completing a purchase). Although FIG. 2 illustrates the bummer database 234 as a separate entity with respect to the inventory database 232, in some implementations, the bummer database 234 is maintained as a field or object associated with inventory records at the inventory database 232.

While the interface 600 illustrates an example interface adapted to detect bummer events via the interface element 605, in other embodiments, the point of sale control application 246 may passively detect the occurrence of a bummer event without the provision of the interface element 605. For example, the point of sale control application 246 may detect a number of times the customer attempted to interact with the greyed out interface element 610. As another example, the point of sale control application 246 may monitor the amount of time the customer spends viewing the interface 600 without making a selection of a product. Accordingly, if the point of sale control application 246 determines that the customer spent a threshold amount of time viewing the interface 600 without making a selection, the point of sale control application 246 may infer that a bummer event occurred. In some embodiments, the point of sale control application 246 may determine the threshold amount of time with respect to a general population of customers that have interacted with a listing of products associated with those displayed by the interface 600. Additionally or alternatively, the point of sale control application 246 may determine the threshold amount of time with respect to an amount of time the customer previously has interacted with a listing of products associated with those displayed by the interface 600. As yet another example, the point of sale control application 246 may determine a bummer event occurred if the customer interacted with an interface element to exit the point of sale interface (not displayed) and/or allows the point of sale interface to time out when one or more stocked out products are displayed by the point of sale control application 246.

It should be appreciated that in these passive techniques to detect bummer events, multiple products may be stocked out. Accordingly, the point of sale control application 246 may associate each of the stocked out items with the bummer event. In some embodiments, the bummer event for each product is weighted based on a likelihood that the particular product led to the bummer event. For example, if a customer frequently purchases a Greek salad and both the Greek salad and Harvest salad are stocked out, the point of sale control application 246 may assign a higher bummer weight to the Greek salad than to the harvest salad. Accordingly, when the management server analyzes the synchronized bummer data to identify an inventory target for the products offered for sale at the vending machine 205, the management server is more likely to increase the inventory target for the Greek salad than the harvest salad. In some embodiments, the weights applied as a result of the aforementioned passive bummer detection techniques is lower than that weight that is applied as a result of an express customer interaction (e.g., interacting with the interface element 605).

In addition to programs, the RAM module 218 and the persistent memory module 230 may store data in a volatile or non-volatile mode, respectively. The RAM module 218 and the persistent memory module 230 further include one or more forms of fixed and/or removable memory, such as read-only memory (ROM), electronic programmable read-only memory (EPROM), RAM, erasable electronic programmable read-only memory (EEPROM), and/or other hard drives, flash memory, MicroSD cards, and others. For example, the inventory database 232, the bummer database 234, and the planogram 236 may be stored as data structures in the persistent memory module 230.

The vending machine 205 may further include transceivers 204 that enable the vending machine 205 to send and receive data over a wireless or wired network (such as the network 120 described with respect to FIG. 1). The transceivers 204 may include one or more transceivers (e.g., WWAN, WLAN, WPAN, EVDO, CDMA, GSM and/or LTE transceivers) functioning in accordance with IEEE standards, 3GPP standards, or other standards. In some embodiments, when the point of sale application 246 detects that a customer has finished an interaction with the display unit 212 (either by completing a purchase or by resulting in a bummer event), the point of sale application 246 may transmit an indication to the management server via the transceivers 204 to synchronize the inventory data and/or the bummer data.

It should be appreciated that the vending machine 205 may include additional or fewer components than what is depicted by FIG. 2. For example, the vending machine 205 may include keys, mice, buttons, or other physical input devices to facilitate user interactions with the vending machine 205. As another example, the vending machine 205 may include one or more external ports or other components that enable service personnel to interact with the vending machine 205, such as a USB or other port via which a service electronic device can be connected to transmit diagnostic messages for troubleshooting and/or maintenance activities. As yet another example, the vending machine 205 may include one or more cameras, scanners, or other sensors connected to track the items stored at the vending machine 205 and/or to support security surveillance, stock monitoring, scanning customer electronic devices, and/or customer biometric recognition, for example.

Example Management Server

Figure 3:
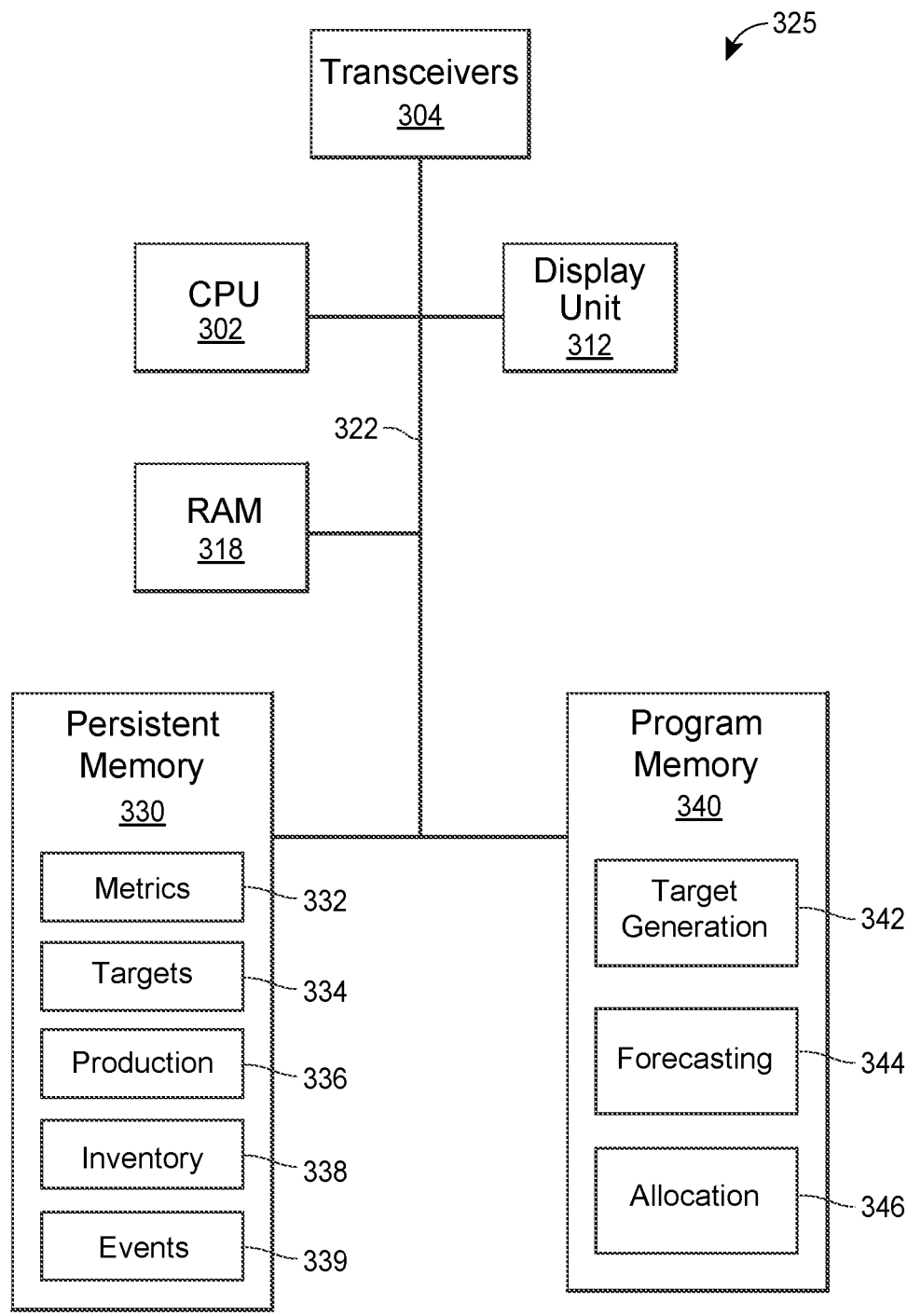
FIG. 3 is a block diagram of an example management server that may be used in the example system of FIG. 1.

Turning to FIG. 3, illustrated is an example management server 325, such as the management server 115 of FIG. 1, at which functionality described herein is implemented. The management server 325 includes one or more processors, such as the depicted central processing unit (CPU) 302. Although not depicted, the management server 325 may also include a graphics processing unit (GPU). During operation, the CPU 302 executes instructions stored in a program memory module 340 coupled to the CPU 302 via a system bus 322. In some implementations, the program memory module 340 is implemented in a random access memory (RAM) module 318, a persistent memory module 330, or both. The program memory module 240 may also store computer-readable instructions that regulate the operation of the management server 325. In some embodiments, the management server 325 is implemented in a distributed computing system. Accordingly, in these embodiments, the CPU 302, the RAM 318, and the memories 330 and 340 may be implemented by CPUs, RAMs, and/or memories located at multiple computing systems.

The program memory 340 may include a set of instructions that form a target generation application 342 configured to determines the inventory target (the "par") for the products offered for sale at vending machines within a network of vending machines (such as the network of vending machines 105 of FIG. 1). As described with respect to FIG. 2, vending machines within the network of vending machines may be configured to synchronize their inventory with the management server 325. The management server 325 may be configured to store the synchronized inventory data at an inventory database 338. Accordingly, the target generation application 342 may be configured to analyze changes to the inventory database 338 to determine one or more metrics associated with each vending machine and/or particular products offered for sale thereat. For example, the metrics may include a stockout rate, a waste rate, a stockout time, a shelf life, a maximum capacity, an item type, a SKU identifier, a restocking schedule, and/or a vending machine identifier. In some embodiments, one or more of the metrics are a set of component metrics with each component metric being indicative of the metric based upon historical data occurring on a particular day of the week. After determining the metrics based upon the inventory data, the target generation application 342 may store the metrics at a metrics database 332.

The target generation application 342 may be configured to analyze the determined metrics to set an inventory target for the products offered for sale at each vending machine. In one implementation, the target generation application 342 determines the inventory target such that based on the restocking schedule for a vending machine and the stockout rate, the waste rate, and the shelf life of a product how much product is needed to ensure that at least one unit of inventory is available at the vending machine each day of the week. In some embodiments, the target generation application 342 may modify the inventory targets for a product based upon one or more prospective and/or retrospective events. Accordingly, the target generation application 342 may be configured to analyze data stored in an events database 339 to detect the events that may impact the inventory target. For example, if the target generation application 342 determines that the event database 339 indicates that a promotional event associated with a particular product is to occur in the near future, the target generation application 342 may increase the inventory target.

The program memory 340 may also include a set of instructions that form a forecasting application 344 configured to predict how much of each product a production facility should make to fulfill the inventory targets generated by the target generation application 342. To determine the forecasted production, the forecasting application 344 may obtain the inventory targets from the inventory target database 334 and the metrics stored at the metrics database 332. Based on the metrics and the inventory targets, the forecasting application 344 may be configured to determine a replenishment rate for each product at each vending machine within the network of vending machines. In some embodiments, the replenishment rate is determined by combining a stockout rate metric and a waste rate metric to determine a rate at which inventory is expected to be depleted during production. Based on the current inventory level and the amount by which the inventory is predicted to be decremented during production, the forecasting application 344 may calculate an expected amount of inventory remaining in the vending machine after production. Accordingly, the forecasting application 344 may be configured to compare the expected amount of inventory to the inventory target to generate the replenishment rate.

With simultaneous reference to FIG. 4, illustrated is an chart 400 depicting a forecasting process. As illustrated by the chart 400, the forecasting application 344 is configured to forecast an amount of product to produce based on aggregate data associated with a plurality of vending machines. Accordingly, the total line indicates the aggregate inventory targets ("pars") for a product across the network of vending machines and a composite replenishment rate for the product across the network of vending machines. In some embodiments, the composite replenishment rate is an average replenishment rate across the network of vending machines. The forecasting application 344 then multiplies the total inventory targets by the composite replenishment rate to generate a forecasted production amount for the product. The forecasting application 344 may forecast the production for a plurality of products offered for sale across the network of vending machines. By aggregating the production forecasts for the individual vending machines, the production facility is isolated from demand fluctuations at individual vending machines within the network of vending machines. As illustrated in FIG. 4, because the inventory target and/or replenishment rate for a vending machine may change based on the particular day of the week, the forecasting application 344 may be configured to forecast a different production amount for each day of the week.

In some embodiments, after generating a production forecast, the management server 325 may be configured to transmit the production forecast to a production device (such as the production device 115 of FIG. 1). In other embodiments, the forecasting application 344 may be configured to store the forecast data in a production database 336 in the memory 330. In these embodiments, prior to executing a production run, a user interacting with the production device may initiate a query to the forecast database to determine an amount of each product to produce. After the production facility executes the production run, the production device may transmit an indication of an amount of product produced by the production facility to the management server 325. Upon receiving the indication, the management server 325 may be configured to update the production database 336 to indicate the amount of product produced.

The program memory 340 may also include a set of instructions that form an allocation program 346 configured to allocate the product produced by the production facility between the network vending machines. More particularly, the allocation program 346 is configured to allocate the product across the network of vending machines in accordance with the inventory targets for the individual vending machines. As described herein, while the aforementioned forecasting techniques improve the accuracy forecasting techniques, often there is a difference between the amount of a product produced and the amount of product required to fulfill each vending machine's inventory target based upon the current inventory levels. Accordingly, the allocation program 346 may be configured to distribute this difference across the network of vending machines in a manner that minimizes the deviations between the inventory targets and the allocated inventory.

The allocation program 346 may implement a set of rules when distributing the difference across the network of vending machines. For example, a first rule may ensure that each vending machine is allocated at least one of each product, and a second rule may ensure that each vending machine is not allocated more inventory than the number of slots assigned to the product multiplied by the amount inventory that can be assigned to each slot (a "maximum par"). Because of the second rule, for products that have an inventory target that is equal to the maximum par may have a real par that is greater than the maximum par (i.e., the vending machine would still sell through the product if the vending machine could accommodate the additional product). Accordingly, the allocation program 346 may be configured to exclude any vending machine associated with the maximum par from being adjusted during the allocation process. Additionally, for vending machines where the current inventory is already equal to the inventory target, the allocation program 346 may implement a rule where that prevents reducing the inventory target for those vending machines.

Consistent with the aforementioned rules, the allocation program 346 may be configured to calculate a percentage by which each vending machine would change based upon being allocated an extra inventory unit (in an overproduction scenario) or being allocated an unfulfilled inventory unit (in an underproduction scenario). The allocation program 346 may then sort the resulting percentages to identify the vending machines corresponding to the smallest changes and assign the extra or unfulfilled inventory unit to those vending machines. In some embodiments, vending machines may be assigned multiple extra or unfulfilled inventory slots. Accordingly, in some embodiments, allocating a vending machine the extra or unfulfilled inventory slot, the allocation program 346 may adjust the inventory target up or down, recalculate the change percentage, and insert the vending machine back into the sorted list. In some scenarios, there may be multiple vending machines associated with the smallest change percentage. Accordingly, the allocation program 346 may be configured to analyze one or more secondary metrics to determine which vending machine should have its inventory target adjusted. For example, the allocation program 346 may be configured to prioritize vending machines associated with a lower cost of delivery (which may be measured in time, distance, or number of items for delivery at the vending machine) or to preserve the inventory at vending machines associated with the highest sales volume.

After the allocation program 346 finishes adjusting the inventory targets for each of the products, the allocation program 346 causes the management server 325 to transmit an indication to the production device that the allocation is complete. In response, the production device prints packaging slips that indicate the amount of products allocated to each vending machine.

In addition to programs, the RAM module 318 and the persistent memory module 330 may store data in a volatile or non-volatile mode, respectively. The RAM module 318 and the persistent memory module 230 further include one or more forms of fixed and/or removable memory, such as read-only memory (ROM), electronic programmable read-only memory (EPROM), RAM, erasable electronic programmable read-only memory (EEPROM), and/or other hard drives, flash memory, MicroSD cards, and others. For example, the metrics database 332, the targets database 334, the production database 336, the inventory database 338, and the events database 339 may be stored as data structures in the persistent memory module 230.

The management server 325 may further include transceivers 304 that enable the management server 325 to send and receive data over a wireless or wired network (such as the network 120 described with respect to FIG. 1). The transceivers 304 may include one or more transceivers (e.g., WWAN, WLAN, WPAN, EVDO, CDMA, GSM and/or LTE transceivers) functioning in accordance with IEEE standards, 3GPP standards, or other standards.

It should be appreciated that the management server 325 may include additional or fewer components than what is depicted by FIG. 3. For example, the management server 325 may include keys, mice, buttons, or other physical input devices to facilitate user interactions with the management server 325. As another example, the management server 325 may include a distributed computing interface that enables computing systems that forms the management server 325 to communicate with one another.

Intelligent Inventory Management

Figure 5:
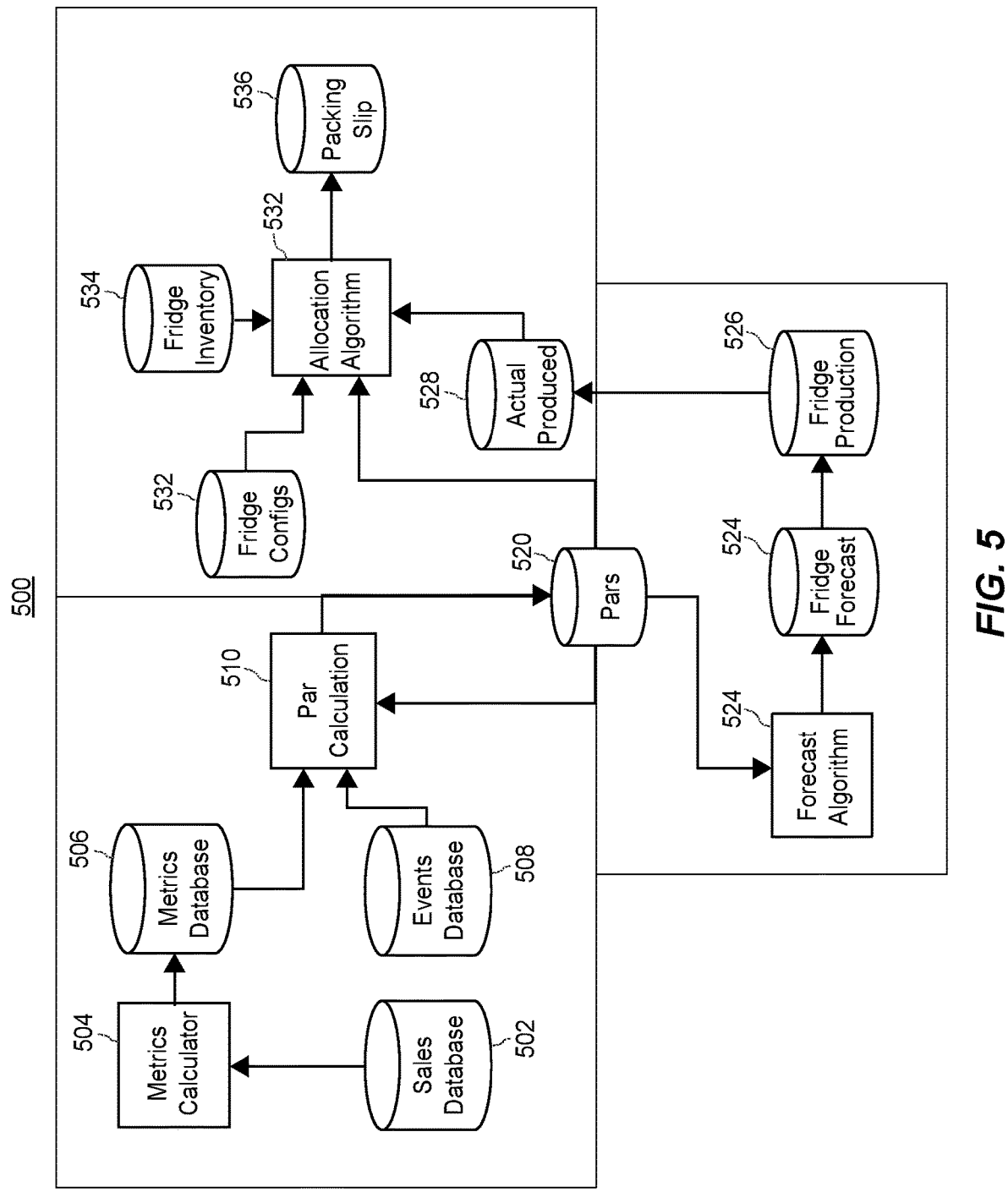
FIG. 5 is a diagram indicative of a forecasting process that may be implemented in the example management server of FIGS. 1 and 3.

FIG. 5 illustrates an example process flow 500 for an intelligent inventory management system implemented, in one embodiment, by a management server (such as the management servers 125 or 325). While FIG. 5 illustrates several processes as distinct logical entities, the processes may be performed by the same computing system. Similarly, while FIG. 5 illustrates several databases as distinct logical entities, the databases may involve data stored at the same physical component. Additionally, in some embodiments, one or more of the databases may be a portion of a data structure associated with another database. For example, the records in the fridge inventory database 534 may include a data structure indicative of sale data. Accordingly, the sales database 502 may be the collection of data structures within the fridge inventory database 534 indicative of the sales data. Thus, while FIG. 5 illustrates the various databases as different entities, in some implementations, a single database entity may implement two or more of the illustrated databases.

The process flow 500 may begin when the management server executes a metrics calculator 504 that analyzes the sales database 502 to generate metrics relating to products sold by the network of vending machines. In some embodiments, the metrics calculator 504 may be configured to ensure that sufficient data has been stored at the sales database 502 to mitigate the impact of single day swings in sales activity. For example, the metrics calculator 504 may be configured to ensure that the sales database 502 includes two weeks' worth of sales data for a product before generating the metrics. Similarly, when generating the metrics, the metrics calculator 504 may only be configured to analyze the sales data on a rolling two week basis. After generating the metrics, the metrics calculator 504 is configured to store the metrics at the metrics database 506.

The next process executed by the management server is a par calculation process 510. As described herein, the par calculation process 510 analyzes the metrics stored at the metrics database 506 to generate the par (e.g., an inventory level that is optimized to reduce both lost sales and wasted products). The management server may be configured to periodically execute the par calculation process 510. For example, the management server may execute the par calculation process 510 daily and/or in accordance with a production schedule. After generating the par, the par calculation process 510 stores the pars at a par database 520.

In some embodiments, the par calculation process 510 may override the normal par calculation based upon an event stored in the event database 508. For example, if a particular vending machine is located at a work place and the event is indicative of heavy snowfall such that workers are likely to work from home, the par calculation process 510 may lower the par for the particular vending machine. On the other hand, if a particular vending machine is located at a work place and the event is indicative of rainfall such that workers are unlikely to venture outside during a lunch break, the par calculation process 510 may increase the par for the particular vending machine. Accordingly, if the par calculation process 510 detects that an event has been added to the events database 508, the par calculation may analyze the event to identify vending machines impacted by the event and modify the par value at the par database 520 for the impacted vending machines.

As illustrated, the next process executed by the management server is a forecast process 522 to forecast production volumes required to maintain the par levels at the network of vending machines. In some embodiments, the management server executes the forecast process 522 weekly to determine production volumes for a plurality of products based on a planned production schedule for the following week. The forecast process 522 may be configured to analyze the par data stored at the par database 520 to determine the forecasted production volumes. More particularly, the forecast process 522 may be configured to compare the par data for a product to a replenishment rate to forecast a production volume required during each production event for the product throughout the week. As described herein, in some embodiments, the par data and the replenishment rate is a vector that includes component par data and replenishment rates for each day of the week. The forecast process 522 stores the overall forecasted production volumes in a fridge forecast database 524 and stores the forecasted production volumes for particular production events in a fridge production database 526.

After the production facility executes a production run in accordance with the data stored in the fridge production database 526, the actual amount of product produced is stored at an actual production database 528. The management server then executes an allocation process 530 to allocate the produced product across the network of vending machines. To determine the allocation, the allocation process 530 analyzes the amount produced to current inventory data stored at a fridge inventory database 534, planogram data stored at a fridge configuration database 532 and/or the par database 520 to determine a portion of the produced product to allocate across the network of vending machines.

As described herein, the allocation process 530 generally attempts to ensure that each of the vending machines is stocked with the inventory par for the product as indicated by the par database 520. However, in many scenarios, the actual production database 528 indicates that the amount of a particular product actually produced does not equal the amount of the product required to restock each vending machine to a par level indicated by the par database 520. Accordingly, the allocation process 530 may be configured to execute a rules-based process and/or a machine learning algorithm to allocate the overproduction or underproduction volume across the network of vending machines in a manner that reduces the amount that the actual inventory allocated to vending machines varies from the par values indicated by the par database 520. After allocating the products across the network of vending machines, the allocation process 530 produces electronic packing slips to indicate to packaging personnel the vending machine shipment in which each product should be included. The allocation process 530 is configured to store the generated electronic packing slips at a packing slip database 536. In some embodiments, in response to the allocation process 530 adding an electronic packing slip to the packing slip database 536, a printer is configured to produce a physical packaging slip indicative of the data included in the electronic packing slip.

In some embodiments, the forecast process 522 obtains data from the events database 520 to determine the forecasted production volumes. For example, if the event indicates that a weather event will cause increased sales of a particular product across the network of vending machines or that a holiday will reduce sales of a particular product across the network of vending machines, the forecast process 522 may increase or decrease the par values obtained from the par database 520 prior to executing the forecasting algorithm. In these embodiments, rather than attempting to analyze the impact of the event at each individual vending machine to set a corresponding par value at the par database 520, the forecast process 520 may account for the impact across the network of vending machines and leave it to the allocation process 530 to distribute the increased or decreased volume of product produced across the network of vending machines in accordance with the rules-based algorithm and/or machine learning algorithm of the allocation process 530. As a result, the intelligent inventory management system is capable of responding to macro-events in a manner that distributes the risks of overreacting or underreacting to the event across the network of vending machines.

Figure 7:
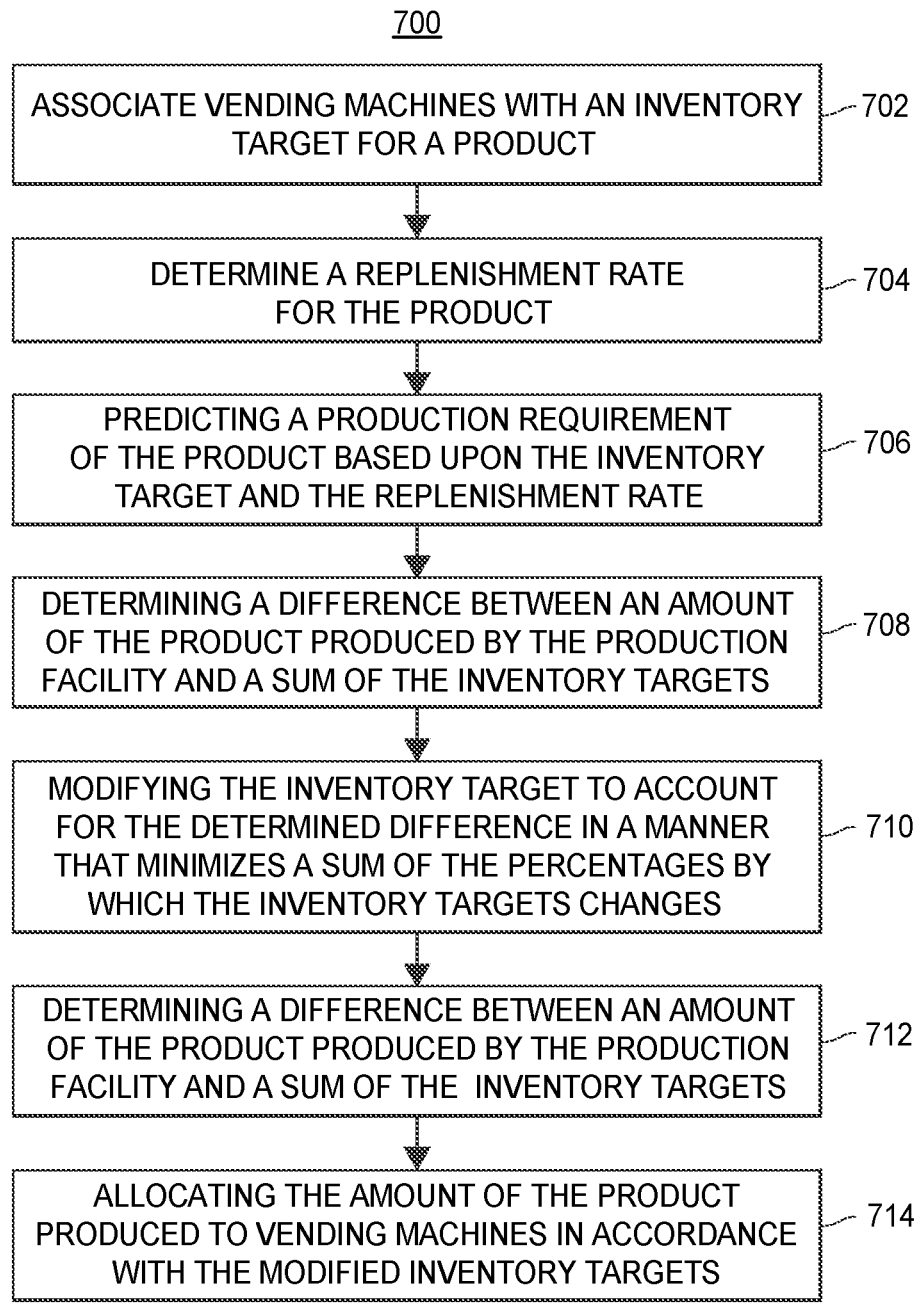
FIG. 7 is a flow diagram of an example method for an intelligent inventory management process implemented at the example management server of FIGS. 1 and 3.

Referring now to FIG. 7, illustrated is a flow diagram of an example method 700 for an intelligent inventory management process implemented at an inventory management server, such as the management servers 125 and 325 of FIGS. 1 and 3, respectively. More particularly, the method 700 relates to intelligently allocating inventory across a network of vending machines (such as the network of vending machines 105 of FIG. 1) supplied by a production facility. To perform the method 700, the management server may store computer executable instructions that are executed by one or more processors of the management server.

The method 700 may begin when the management server associates vending machines within the network of vending machines with an inventory target for a product (block 702). For example, the management server may execute the target generation application 342 of FIG. 3 or the par calculation process 510 of FIG. 5. To associate the vending machine with the inventory target for a particular product, the management server may be configured to analyze at least one of a stockout time for the product, a shelf life of the product, a waste rate for the product, and a product type for the product to determine the inventory target. In some embodiments, the inventory target is a composite inventory target that includes component inventory targets corresponding to particular days of the week.

In some embodiments, a particular vending machine (such as the vending machine 105*a* or 205 of FIGS. 1 and 2, respectively) of the network of vending machines is configured to provide an interface via which a customer indicates that the customer was unable to purchase the product. In these embodiments, the management server may be configured to determine the inventory target by analyzing a number of indications provided via the interface. For example, the interface of the vending machine may be graphical user interface (such as the interface 600 of FIG. 6) provided by the particular vending machine. Accordingly, the management server may be configured to increase the inventory target based on the number of indications provided via the interface of the particular vending machine.

At block 704, the management server may be configured to determine a replenishment rate for the product at the vending machines within the network of vending machines. For example, the management server may be configured to execute the metrics process 504 or the forecast process 522 of FIG. 5 to calculate the replenishment rate for a product at a particular vending machine. As described herein, the replenishment rate may be indicative of a rate at which products are needed to replace sold and wasted products at the vending machine. In some embodiments, the replenishment rate is a composite replenishment rate that includes component replenishment rates corresponding to particular days of the week.

At block 706, the management server may be configured to predict a production requirement of the product for the production facility based upon the respective inventory targets and the respective replenishment rates for the network of vending machines. For example, the management server may be configured to execute the forecasting application 344 of FIG. 3 or the forecasting process 522 of FIG. 5 to determine the predicted production requirements. In some embodiments, to predict the production requirement, the management server is configured to obtain an indication of an event and adjust the predicted production requirement based upon the event. As one example, the management server may determine that the event is a weather-related event and increase the predicted production requirement. As another example, the management server may determine that the event is a holiday and decrease the predicted production requirement. As described herein, due to the time lag between when the production requirement is predicted and when the product is produced, a mismatch between the predicted production requirement and the actual production need after the production run is executed.

Accordingly, at block 708, the management server may be configured to determine a difference between an amount of the product produced by the production facility based upon the predicted production requirement and a sum of the inventory targets for the vending machines within the network of vending machines. At block 710, the management server may be configured to calculate a percentage by which the respective inventory target of vending machines within the network of vending machines changes if the respective inventory target is modified to account for the determined difference. At block 712, the management server may be configured to modify the inventory target for vending machines of the network of vending machines to account for the determined difference in a manner that minimizes a sum of the percentages by which the respective inventory targets changes. For example, to perform the actions at blocks 708-712, the management server may be configured to execute the allocation program 346 of FIG. 3 or the allocation process 530 of FIG. 5.

In some embodiments, to minimize the sum of the percentages, the management server is configured to select the vending machines associated with the smallest calculated percentage until a number of selections equaling the calculated difference occur. It should be appreciated that in some embodiments, the management server may include one or more rules that prevents a particular vending machine from being selected for modification. As one example, in an underproduction scenario where the modification includes decreasing the inventory target, the management server may be configured to comply with a rule that prevent decreasing the inventory target below a current inventory level. Accordingly, before performing the selection, the management server may be configured to determine an amount of inventory of the product at a particular vending machine and not select the particular vending machine when the particular vending machine is associated with the smallest calculated percentage if the inventory target is equal to the inventory at the particular vending machine. As another example, in an overproduction scenario where the modification includes increasing the inventory target, the management server may be configured to comply with a rule that prevents increasing the inventory target beyond a maximum capacity for the vending machine. Accordingly, before performing the selection, the management server may be configured to determine a maximum inventory of the product at a particular vending machine and not select the particular vending machine when the particular vending machine is associated with the smallest calculated percentage if the inventory target is equal to the maximum inventory at the particular vending machine. In some embodiments, the management server is configured to select the vending machines with replacement.

In some scenarios, more than one vending machine may be associated with the smallest calculated percentage. Accordingly, the management server may be configured to determine that a first vending machine and a second vending machine are associated with the same percentage by which the respective inventory target of the first and second vending machines changes. In this scenario, the management server may be configured to select one of the first vending machine and the second vending machine based upon determined costs to deliver the product to the first and second vending machines.

At block 714, the management server may be configured to allocate the amount of the product produced by the production facility to vending machines of the network of vending machines in accordance with the modified inventory targets. In some embodiments, the management server is configured to generate a packing slip for the vending machines within the network of vending machines that indicates the allocated product produced by the production facility and allocated to a particular vending machine.

ADDITIONAL CONSIDERATION

As mentioned above, aspects of the systems and methods described herein are controlled by one or more controllers. The one or more controllers may be adapted to run a variety of application programs, access and store data, including accessing and storing data in the associated databases, and enable one or more interactions as described herein. Typically, the controller is implemented by one or more programmable data processing devices. The hardware elements, operating systems, and programming languages of such devices are conventional in nature, and it is presumed that those skilled in the art are adequately familiar therewith.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller. For example, the one or more controllers may include a graphics subsystem to drive the output mechanism. The links of the peripherals to the system may be wired connections or use wireless communications.

Although summarized above as a PC-type implementation, those skilled in the art will recognize that the one or more controllers also encompasses systems such as host computers, cloud computers, servers, workstations, network terminals, and the like. Further one or more controllers may be embodied in a device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

What is claimed is:

1. A computer-implemented method for intelligently allocating inventory across a network of vending machines, wherein the network of vending machines are supplied by a production facility, and wherein vending machines included in the network of vending machines are configured to provide an interface via which a customer indicates that the customer was unable to purchase a product, the method comprising:

associating, via one or more processors of a management server communicatively coupled to a production device of the production facility, the vending machines within the network of vending machines with a respective inventory target for a product, wherein determining a respective inventory target for the product at a particular vending machine includes analyzing a number of indications provided via the interface of the particular vending machine, and wherein vending machines included in the network of vending machines are configured to provide an interface via which a customer indicates that the customer was unable to purchase a product;

determining, via the one or more processors, a replenishment rate for the product at the vending machines within the network of vending machines;

predicting, via the one or more processors, a production requirement of the product for the production facility based upon the respective inventory targets and the respective replenishment rates for the network of vending machines;

causing, via the one or more processors, the production device to initiate production of the product based upon the predicted production requirement;

determining, via the one or more processors, a difference between an amount of the product produced by the production facility based upon the predicted production requirement and a sum of the amount of product required to fulfill the inventory targets for the vending machines within the network of vending machines;

calculating, via the one or more processors, a percentage by which the respective inventory target of vending machines within the network of vending machines changes if the respective inventory target is modified to account for a unit included in the determined difference;

modifying, via the one or more processors, the inventory target for vending machines of the network of vending machines to account for the determined difference in a manner that minimizes a sum of the percentages by which the respective inventory targets changes; and allocating, via the one or more processors, the amount of the product produced by the production facility to vending machines of the network of vending machines in accordance with the modified inventory targets, wherein allocating products causes the product to be delivered to vending machines in the network of vending machines in accordance with the allocated amount of the product.

2. The computer-implemented method of claim 1, wherein minimizing the sum of the percentages by which the respective inventory targets changes comprises:
based on the calculated percentage by which the respective inventory target of the vending machines, selecting, via the one or more processors, the vending machines associated with the smallest calculated percentage until a number of selections equaling that is equal to the calculated difference occur.

3. The computer-implemented method of claim 2, wherein:
modifying the inventory target for vending machines comprises decreasing the inventory target; and
selecting the vending machines associated with the smallest calculated percentage comprises:
determining, via the one or more processors, an amount of inventory of the product at a particular vending machine; and not selecting, via the one or more processors, the particular vending machine when the particular vending machine is associated with the smallest calculated percentage if the inventory target is equal to the inventory at the particular vending machine.

4. The computer-implemented method of claim 2, wherein:
modifying the inventory target for vending machines comprises increasing the inventory target; and
selecting the vending machines associated with the smallest calculated percentage comprises:
determining, via the one or more processors, a maximum inventory of the product at a particular vending machine; and
not selecting, via the one or more processors, the particular vending machine when the particular vending machine is associated with the smallest calculated percentage if the inventory target is equal to the maximum inventory at the particular vending machine.

5. The computer-implemented method of claim 2, wherein selecting, with replacement, the vending machines associated with the smallest calculated percentage comprises:
determining, via the one or more processors, a first vending machine and a second vending machine are associated with the same percentage by which the respective inventory target of the first and second vending machines changes; and
selecting, via the one or more processors, one of the first vending machine and the second vending machine based upon determined costs to deliver the product to the first and second vending machines.

6. The computer-implemented method of claim 2, wherein selecting the vending machines associated with the smallest calculated percentage comprises:
selecting, with replacement and via the one or more processors, the vending machines associated with the smallest calculated percentage.

7. The computer-implemented method of claim 1, wherein associating the particular vending machine within the network of vending machines with the respective inventory target for the product comprises:
analyzing, via the one or more processors, at least one of a stockout time for the product, a shelf life of the product, a waste rate for the product, and a product type for the product to determine the inventory target.

8. The computer-implemented method of claim 1, wherein the respective inventory targets and the respective replenishment rates include component inventory targets and component replenishment rates corresponding to particular days of the week.

9. The computer-implemented method of claim 1, wherein predicting the production requirement comprises:
obtaining, by the one or more processors, an indication of an event; and
adjusting, by the one or more processors, the predicted production requirement based upon the event.

10. The computer-implemented method of claim 9, wherein adjusting the predicted production requirement based upon the event comprises:
determining, by the one or more processors, that the event is a weather-related event; and
increasing, by the one or more processors, the predicted production requirement.

11. The computer-implemented method of claim 9, wherein adjusting the predicted production requirement based upon the event comprises:

determining, by the one or more processors, that the event is a holiday, and decreasing, by the one or more processors, the predicted production requirement.

12. A system comprising:

one or more processors;

one or more transceivers adapted to communicate with a network of vending machines and a production device associated with a production facility over a one or more communication networks; and one or more non-transitory memories coupled to the one or more processors and the one or more transceivers, the one or more non-transitory memories storing a set of computer executable instructions that, when executed by the one or more processors, cause the system to:

associate vending machines within a network of vending machines with a respective inventory target for a product, wherein the vending machines included in the network of vending machines are configured to provide an interface via which a customer indicates that the customer was unable to purchase a product, and wherein determining a respective inventory target for the product at a particular vending machine includes analyzing a number of indications provided via the interface of the particular vending machine;

determine a replenishment rate for the product at the vending machines within the network of vending machines;

predict a production requirement of the product based upon the respective inventory targets and the respective replenishment rates for the network of vending machines;

cause the production device to initiate production of the product based upon the predicted production requirement;

determine a difference between an amount of the product produced by a production facility and a sum of the amount of product required to fulfill the inventory targets for the vending machines within the network of vending machines;

calculate a percentage by which the respective inventory target of vending machines within the network of vending machines changes if the respective inventory target is modified to account for a unit included in the determined difference;

modify the inventory target for vending machines of the network of vending machines to account for the determined difference in a manner that minimizes a sum of the percentages by which the respective inventory targets changes; and allocate the amount of the product produced by the production facility to vending machines of the network of vending machines in accordance with the modified inventory targets, wherein allocating products causes the product to be delivered to vending machines in the network of vending machines in accordance with the allocated amount of the product.

13. The system of claim 12, wherein to minimize the sum of the percentages by which the respective inventory targets changes, the instructions, when executed cause the system to:

based on the calculated percentage by which the respective inventory target of the vending machines, select the vending machines associated with the smallest calculated percentage until a number of selections equaling that is equal to the calculated difference occur.

14. The system of claim 13, wherein:

to modify the inventory target for vending machines, the instructions, when executed cause the system to decrease the inventory target; and to select the vending machines associated with the smallest calculated percentage, the instructions, when executed cause the system to:

determine, an amount of inventory of the product at a particular vending machine; and not select the particular vending machine when the particular vending machine is associated with the smallest calculated percentage if the inventory target is equal to the inventory at the particular vending machine.

15. The system of claim 13, wherein:

to modify the inventory target for vending machines, the instructions, when executed cause the system to increase the inventory target; and to select the vending machines associated with the smallest calculated percentage, the instructions, when executed cause the system to:

determine a maximum inventory of the product at a particular vending machine; and not select the particular vending machine when the particular vending machine is associated with the smallest calculated percentage if the inventory target is equal to the maximum inventory at the particular vending machine.

16. The system of claim 12, wherein to associate the particular vending machine within the network of vending machines with the respective inventory target for the product, the instructions, when executed cause the system to:

analyze at least one of a stockout time for the product, a shelf life of the product, a waste rate for the product, and a product type for the product to determine the inventory target.

17. The system of claim 12, wherein the respective inventory targets and the respective replenishment rates include component inventory targets and component replenishment rates corresponding to particular days of the week.

18. The system of claim 12, wherein to predict the production requirement, the instructions, when executed cause the system to:

obtain an indication of an event; and adjust the predicted production requirement based upon the event.

* * * * *